(12) United States Patent
Bafna et al.

(10) Patent No.: US 11,811,326 B2
(45) Date of Patent: Nov. 7, 2023

(54) REDUCING TRANSIENTS FOR MULTIPHASE POWER REGULATORS

(71) Applicant: TEXAS INSTRUMENTS INCORPORATED, Dallas, TX (US)

(72) Inventors: Naman Bafna, Madhya Pradesh (IN); Cheng Wei Chen, Manchester, NH (US); Preetam Charan Anand Tadeparthy, Bangalore (IN); Sreelakshmi Suresh, Bangalore (IN); Ammineni Balaji, Andhra Pradesh (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 89 days.

(21) Appl. No.: 17/682,747

(22) Filed: Feb. 28, 2022

(65) Prior Publication Data

US 2023/0130783 A1    Apr. 27, 2023

Related U.S. Application Data

(60) Provisional application No. 63/270,511, filed on Oct. 21, 2021.

(51) Int. Cl.
*H02M 3/158* (2006.01)
*H02M 1/00* (2006.01)
*H02M 3/156* (2006.01)

(52) U.S. Cl.
CPC ....... *H02M 3/1586* (2021.05); *H02M 1/0003* (2021.05); *H02M 3/1584* (2013.01); *H02M 3/1566* (2021.05)

(58) Field of Classification Search
CPC ............ H02M 3/1582; H02M 3/1584; H02M 3/1566; H02M 1/0003; H02M 1/0025
See application file for complete search history.

(56) References Cited

U.S. PATENT DOCUMENTS

| | | | |
|---|---|---|---|
| 6,965,502 B2 | 11/2005 | Duffy et al. | |
| 10,560,023 B2 | 2/2020 | Cheng et al. | |
| 2009/0121695 A1* | 5/2009 | Pierson | H02M 3/1584 323/283 |

(Continued)

OTHER PUBLICATIONS

Carmen Parisi; Application Report: Multiphase Buck Design from Start to Finish (Part 1); SLVA882B—Apr. 2021; 19 pgs.

*Primary Examiner* — Alex Torres-Rivera
(74) *Attorney, Agent, or Firm* — Charles F. Koch; Frank D. Cimino (57) ABSTRACT

An example circuit includes a loop controller having current phase inputs, a feedback input, a control loop output and a transient event output. The feedback input is adapted to be coupled to an output terminal of a multi-phase power stage. A PWM circuit has a blanking input, a control input and a PWM output, the control input coupled to the control loop output. A phase management circuit has a transient detect input, a PWM input, a blanking output and phase outputs. The transient detect input is coupled to the transient event output. The PWM input is coupled to the PWM output and the blanking output is coupled to the blanking input. Each of the phase outputs is adapted to be coupled to a respective phase of the multi-phase power stage. The phase management circuit is configured to provide a blanking control signal representative of a variable blanking time.

23 Claims, 8 Drawing Sheets

(56) References Cited

U.S. PATENT DOCUMENTS

| | | | | |
|---|---|---|---|---|
| 2015/0326120 A1* | 11/2015 | Kelin | ................... | H02M 3/158 |
| | | | | 323/282 |
| 2021/0143735 A1* | 5/2021 | You | ................... | H02M 3/1584 |
| 2021/0384821 A1* | 12/2021 | Chen | ................... | H02M 3/1566 |

* cited by examiner

REDUCING TRANSIENTS FOR MULTIPHASE POWER REGULATORS

CROSS-REFERENCE TO RELATED APPLICATION

This application claims priority to U.S. provisional application No. 63/270,511, filed 21 Oct. 2021, which is incorporated herein by reference in its entirety.

TECHNICAL FIELD

This description relates to control circuits and systems configured to reduce transients for multiphase power regulators.

BACKGROUND

Power converters can be implemented in a variety of different ways. Power converters are configured to convert electrical energy from one form to another and can be classified based on the type of power conversion they perform. Power converters can be implemented as linear or switching power supplies. Examples of switching power supplies include buck, boost and buck-boost converters. High current systems sometimes use multiphase power converters to achieve reduced ripple and improved response times. For example, a multiphase power converter includes a parallel set of power phases, in which each phase has an inductor and set of power switches (e.g., field effect transistors (FETs)). The phases are connected in parallel and share an output capacitor coupled to an output. During operation, respective phases are active at spaced time intervals depending on the total number of phases. While multiphase regulators can offer benefits over single-phase converters, there are some challenges to overcome in order to implement a successful multi-phase converter.

SUMMARY

An example circuit includes a loop controller having current phase inputs, a feedback input, a control loop output and a transient event output. The feedback input is adapted to be coupled to an output terminal of a multi-phase power stage. A pulse width modulation (PWM) circuit has a blanking input, a control input and a PWM output, the control input coupled to the control loop output. A phase management circuit has a transient detect input, a PWM input, a blanking output and phase outputs. The transient detect input is coupled to the transient event output. The PWM input is coupled to the PWM output and the blanking output is coupled to the blanking input. Each of the phase outputs is adapted to be coupled to a respective phase of the multi-phase power stage. The phase management circuit is configured to provide a blanking control signal representative of a variable blanking time.

Another example circuit includes a loop controller configured to provide a loop control signal responsive to a feedback voltage representative of an output voltage of a multi-phase power stage and a combined measure of current provided to phases of the multi-phase power stage. The loop controller includes a transient detector configured to provide a transient event signal responsive to detecting a transient event based on the output voltage and the combined measure of current. A phase management circuit is configured to provide a blanking control signal responsive to the transient event signal and to provide drive signals to respective phases of a power stage responsive to a pulse width modulation (PWM) output signal. A PWM circuit is configured to provide the PWM output signal responsive to the loop control signal and the blanking control signal, in which the PWM output signal has a variable blanking time responsive to the blanking control signal.

An example of a system includes a multi-phase power stage circuit and a control circuit. The multi-phase power stage circuit includes a first phase drive circuit having a first drive input and a first drive output, in which the first drive output is coupled to an output terminal. The multi-phase power stage circuit includes a second drive circuit having a second drive input and a second drive output, in which the second drive output is coupled to the output terminal. First and second current sensors have first and second current sense outputs. Each of the first and second current sensors is configured to provide a measure of current at the respective first and second current sense outputs representative of current for the respective first and second drive circuits. The control circuit includes a loop controller, a pulse width modulation (PWM) circuit and a phase management circuit. The loop controller has first and second current phase inputs, a feedback input, a control loop output and a transient output. The first and second current phase inputs are coupled to the respective first and second current sense outputs and the feedback input is coupled to the output terminal. The loop controller is configured to provide a transient event signal at the transient output responsive to detecting a transient event based on respective signals at the current phase inputs and the feedback input. The PWM circuit has a blanking input, a control input and a PWM output, in which the control input is coupled to the control loop output. The phase management circuit has a transient detect input, a PWM input, a blanking output and phase outputs. The transient detect input is coupled to the transient output, the PWM input is coupled to the PWM output, and the blanking output is coupled to the blanking input. Each of the phase outputs is coupled to a respective drive input of the multi-phase power stage circuit. The phase management circuit is configured to control a blanking time of a blanking control signal provided at the blanking output responsive to the transient event signal.

DETAILED DESCRIPTION

This description relates to control circuits and to multi-phase power regulator circuits configured to reduce transients at an output terminal of the multi-phase power regulator circuit. For example, a power regulator includes a control circuit and a multi-phase power stage. The power stage can include phase drive circuits, also referred to herein as phases. Each phase is coupled between a respective drive input and an output terminal of the regulator circuit, to which a load can be coupled. The control circuit is configured to provide respective drive signals (e.g., PWM drive signals) to the respective drive inputs to control switches of the respective phases for supplying current to the output terminal so a regulated output voltage is provided at the output terminal.

A load (e.g., a processor or other device) can be coupled to the output terminal to receive the regulated output voltage. When current draw of the load changes rapidly, such as responsive to an increased load demand or a reduced load demand, transient events can occur at the output terminal. For example, if the current draw of the load increases rapidly, the multi-phase power regulator may not have sufficient time to add in, or activate, enough phases to supply the current, which results in a voltage undershoot by the multi-phase power regulator. Similarly, if the current draw of the load drops suddenly, the multi-phase power regulator may experience a voltage overshoot responsive to excess current being provided. A given application can specify a tolerance band for the output voltage with undershoot and overshoot margins. The undershoot margin specifies a maximum voltage undershoot that can be tolerated responsive to a rapid increase in current draw, and the overshoot margin specifies a maximum voltage overshoot that can be tolerated responsive to a rapid decrease in current draw.

As described herein, the control circuit includes a blanking control circuit configured to adjust a blanking time interval of a blanking control signal responsive to detecting a transient event (e.g., undershoot and/or overshoot) at the output terminal. A pulse width modulation (PWM) circuit is configured to generate a PWM output signal responsive to a loop control signal and the blanking control signal. A phase management circuit is configured to provide drive signals to respective phases of a power stage responsive to the PWM output signal and other control signals. In an example, the blanking control circuit is configured to reduce the blanking time (e.g., to a minimum blanking time) at a rising edge of the load current to reduce undershoot in the output voltage. The phase management circuit can also be configured to add a number of (e.g., all) phases into the phase interleave at the power stage to further reduce undershoot at the load insertion event. In another example, the blanking control circuit is configured to increase the blanking time (e.g., to a value above the minimum blanking time) at a falling edge of the load current to reduce overshoot in the output voltage at load removal events. By implementing controls, as described herein, transients (e.g., voltage undershoot and/or overshoot) can be reduced at the output terminal. The reduction in undershoot and overshoot enables the margins to be increased with respect to a given tolerance band. Because the margins can be increased, the size of an output capacitor can be reduced, further enabling an overall cost savings on materials.

Figure 1:
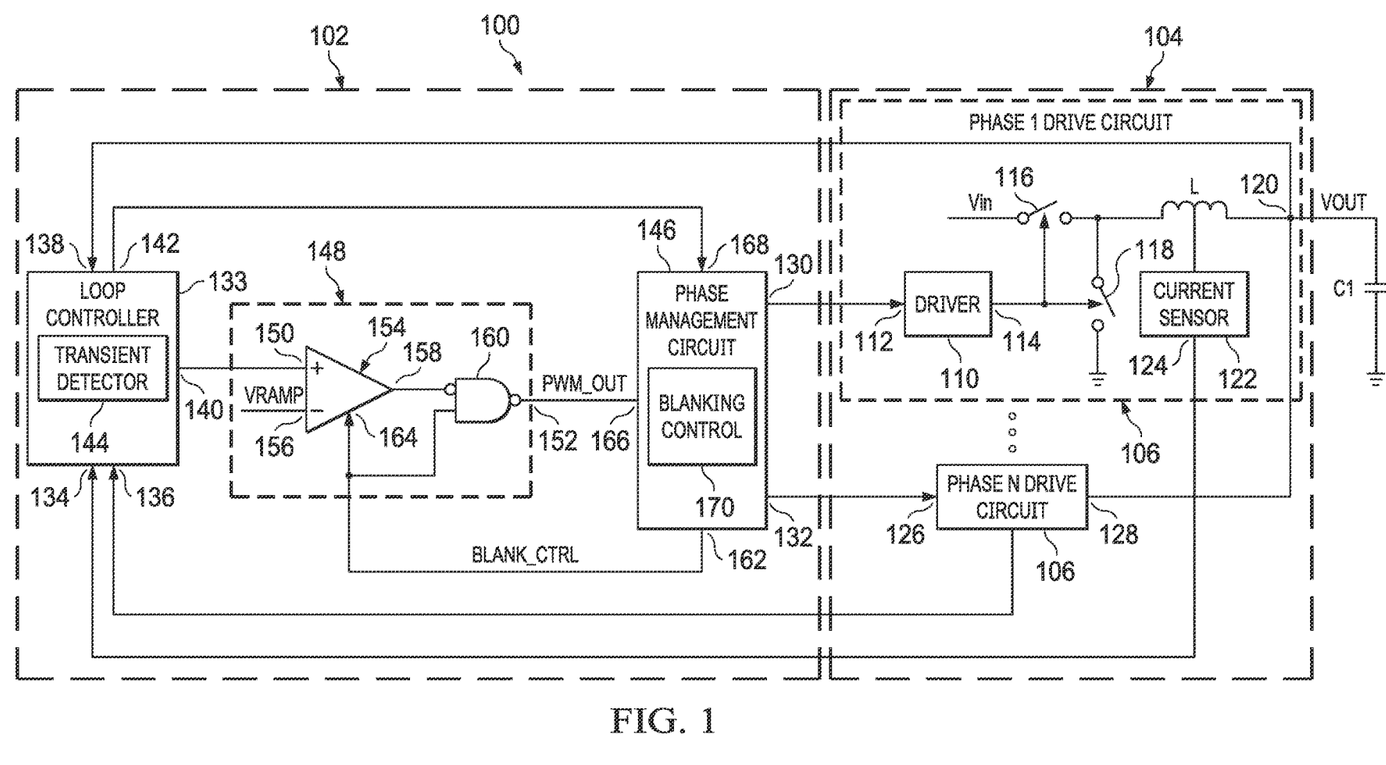
FIG. 1 illustrates an example of a multi-phase power regulator circuit.

FIG. 1 depicts an example of a multi-phase power regulator circuit 100. The power regulator circuit 100 can be configured as any type of switching regulator, such as including a buck regulator, a boost regulator or buck-boost regulator depending on application requirements. The power regulator circuit 100 further can be implemented in any of a variety of electronic devices, such as computers (e.g., servers), hardware accelerators, application specific integrated circuits (ASICs), network interface cards, or other electronic devices and systems (e.g., vehicles). The power regulator circuit 100 includes a control circuit 102 and a multi-phase power stage circuit 104.

As used herein, the term "circuit" can include a collection of active and/or passive elements that perform a circuit function, such as an analog circuit or control circuit. Also or alternatively, for example, the term "circuit" can include an integrated circuit (IC) where all and/or some of the circuit elements are fabricated on a common substrate (e.g., semiconductor substrate, such as a die or chip). Thus, the power regulator circuit 100 or its constituent parts (e.g., control circuit 102 and/or power stage circuit 104) can be implemented on a semiconductor substrate. In one example, the control circuit 102 is implemented in a discrete IC and is coupled to respective phase drive circuits 106 for each phase of the power stage circuit 104, shown as phases 1 to N, where N is a positive integer greater than 1 representative of the number of phases. Each of the phase drive circuits 106 can have a common configuration.

As an example, the phase drive circuit (e.g., phase drive circuit 1) 106 includes a driver 110 having a drive input 112 and a drive output 114. The drive input 112 is coupled to a respective phase output of the control circuit 102. The drive output 114 is coupled to control inputs of high-side and low-side switches 116 and 118, respectively. Each of the switches 116 and 118 is coupled to a terminal of an inductor L1 for the respective phase circuit 106, and the inductor is coupled to an output terminal 120 of the power regulator circuit 100. In an example, the high-side and low-side switches 116 and 118 are implemented as metal oxide semiconductor field effect transistors (MOSFETs or FETs). In other examples, the switches 116 and 118 can be implemented as other types of transistors, such as insulated-gate bipolar transistors (IGBTs), bipolar junction transistors (BJTs), laterally-diffused metal-oxide semiconductor (LD-MOS) transistors, and the like.

In the example of FIG. 1, a capacitor C1 is coupled to the output terminal 120 for providing a regulated output voltage VOUT at the output terminal. The capacitor C1 can be implemented by one or more capacitors, which may have an equivalent series resistance. In other examples, a resistor-capacitor network (e.g., having one or more capacitors and resistors) can be coupled to the output terminal 120. A current sensor 122 is configured to sense current supplied by the respective phase circuit 106 and provide a signal representative of a measure of current at a current sensor output 124. For example, the current sensor can be coupled to the inductor L, to the power switches 116, 118 or otherwise placed in the current path to sense the phase current. As mentioned, the other phase drive circuits 106 in the multi-phase output stage 104 can be configured the same, including having a drive input 126 coupled to another phase output and a drive output 128 coupled to the output terminal 120.

The control circuit 102 includes phase outputs 130 and 132 coupled to respective drive inputs 112 and 126 of the power stage 104. The control circuit 102 is configured to provide a PWM signal out to each driver circuit 106, which is configured to convert the PWM signal into the upper and lower gate drive signals for controlling respective switches thereof. In another example, the control circuit 102 includes integrated drivers, which are coupled to discrete power switches of the respective phase drive circuits 106. In yet another example, the control circuit 102 is implemented as a system on chip (SoC) that includes a driverless controller IC coupled to the power switches in an integrated package.

As described herein, the control circuit 102 is configured to reduce undershoot and/or overshoot in the output voltage VOUT at the output terminal 120 responsive to detecting a transient event at the output terminal. For example, the transient event is a voltage undershoot resulting from an increased current draw by a load (e.g., load activation) coupled to the output terminal 120. In another example, the transient event is a voltage overshoot resulting from a reduced current draw by the load (e.g., load deactivation).

As shown in the example of FIG. 1, the control circuit 102 includes a loop controller 133 having current phase inputs 134 and 136, a feedback voltage input 138, a control loop output 140 and a transient event output 142. The feedback voltage input 138 is coupled to the output terminal 120. Each of the current phase inputs 134 and 136 is coupled to a respective current sensor output of a current sensor 122 for a respective phase drive circuit 106. The current phase inputs thus receive a measure of current being supplied by respective phases of the multi-phase power stage 104 to the output terminal 120. The loop controller 133 includes circuitry configured to generate a loop control signal at the loop output 140 responsive to the output voltage VOUT and the measure of current being supplied to the output terminal 120. For example, a combination of internal or external components can be configured to generate the loop signal. The components can include amplifiers, resistors, capacitors, which can be combined to implement control circuitry, which may implement proportional-integral (PI), proportional-integral-derivative (PID) or other control depending on the application.

The loop controller 133 also includes a transient detector 144 configured to provide a transient event signal at the transient event output 142 responsive to respective signals at the feedback input 138 and the current phase inputs 134 and 136. The transient event output is coupled to an input of a phase management circuit 146. The transient event can be a load insertion event or a load removal event, which causes a sudden change in load current. For example, the transient detector 144 is configured to determine a difference between voltage droop at the output terminal 120 and a changing sum of the phase currents. The transient detector 144 can be configured to determine voltage droop as a difference between the output voltage VOUT and a reference value for setting the regulated voltage. The transient detector 144 can be configured to determine the changing sum of the phase currents by multiplying the detected phase currents by a gain value. The transient detector 144 can compare the difference between voltage droop and the sum of the phase currents to one or more thresholds to detect a respective transient event. For example, the one or more thresholds can be internally tuned through calibrations or externally programmed (e.g., through one or more program pins of an IC implementing the circuit). By using multiple thresholds, the circuit 100 can be tuned according to the system and application requirements. The transient detector 144 can provide one or more transient event signals, which may specify the type of transient event.

The control circuit 102 also includes a PWM circuit 148 having an input 150 and an output 152. The input 150 is coupled to the loop output 140, and the output 152 is coupled to an input of the phase management circuit 146. The PWM circuit 148 is configured to generate a PWM output signal at the output 152 responsive to the loop control signal. In the example of FIG. 1, the PWM circuit includes a comparator 154 having an inverting input 156 configured to receive a ramp signal, shown as VRAMP. For example, a ramp generator circuit (not shown) is configured to provide the ramp signal VRAMP. The non-inverting input 150 is coupled to the loop output and thus is configured to receive the loop signal. The comparator 154 is configured to provide a PWM signal at an output 158 based on a comparison of the loop signal and the ramp signal. The PWM circuit 148 can also include logic 160 having a first, inverting input coupled to the comparator output 158 and a second input coupled to a blanking output 162 of the phase management circuit 146. The blanking output 162 is also coupled to a control voltage input 164 of the comparator 154. The logic 160 can be configured to convert an analog PWM signal into a digital version as well as, if desired, invert the PWM signal to provide an active low PWM signal. In other examples, the logic 160 may be omitted or be implemented differently than as shown in FIG. 1.

The phase management circuit 146 has a PWM input 166, a transient detect input 168, the blanking output 162 and the phase outputs 130 and 132. The transient detect input 168 is coupled to the transient event output 142, and the PWM input 166 is coupled to the PWM output 152. The phase management circuit 146 is configured to provide phase output signals (e.g., pulses) to each of the phase drive circuits 106 to drive different phases separately. For example, the phase management circuit 146 is implemented as digital circuitry that includes a multiplexer and/or other digital circuitry configured to multiplex the PWM_OUT signal to drive the respective phases in a time interleaved manner (e.g., a round robin time-divided manner) responsive to each pulse in the PWM_OUT signal. The phase management circuit 146 can also be configured to control the number of phases that will be used in the interleave responsive to the transient event signal. For example, if the transient event signal has a value representative of an undershoot condition (e.g., at a rising edge of the load current during a load insertion event), the phase management circuit 146 is configured to increase the number of phases in the interleave so the load current increase accordingly. In an example, responsive to detecting the undershoot condition, phase management circuit 146 is configured to add all the phases to the interleave rapidly (e.g., instantaneously) to increase the load current. This is in contrast to gradually increasing the number of phases that are activated into the interleave over a number of loop cycles. In another example, if the transient event signal has a value representative of an overshoot condition (e.g., at a falling edge of the load current at a load removal event), the phase management circuit 146 can be configured to decrease the number of phases (e.g., perform phase shedding), such as to only use a designated portion of phases to decrease the load current.

The phase management circuit 146 also includes a blanking control circuit 170 configured to provide a blanking control signal BLANK_CTRL at the blanking output 162. The PWM circuit 148 is configured to impose a minimum spacing between successive PWM signals responsive to the blanking control signal (e.g., a pulse) at the blanking output 162. The PWM comparator 154 is configured to force the PWM output 152 to a respective state (e.g., high or low) for a duration referred to herein as a blanking time responsive to the blanking control signal at the voltage control input 164. For example, the PWM comparator 154 and logic 160 are configured to force the comparator output high if the blanking control signal is low, and to allow the PWM comparator and logic to set the output responsive to the signals at 150 and 156 if the blanking control signal is high. The blanking control circuit 170 is configured to vary the duration of the blanking time provided in the blanking control signal responsive to the transient event signal. In this way, the blanking control circuit 170 can dynamically adjust the blanking time to reduce overshoot or undershoot transients at the output 120 depending on circuit conditions. As an example, if the transient event signal has a value representative of a detected undershoot event, the blanking control circuit can reduce the blanking time to a minimum value so more PWM pulses can be generated in a given time interval. In some examples, the phase management circuit 146 can be configured to implement the reduction in blanking time in combination with phase addition to further reduce undershoot responsive to the transient event signal indicating an undershoot condition. As another example, if the transient event signal has a value representative of a detected overshoot event, the blanking control circuit can increase the blanking time to a nominal value, which is greater than used during the detected undershoot event, so fewer PWM pulses are generated in a given time interval.

Figure 2:
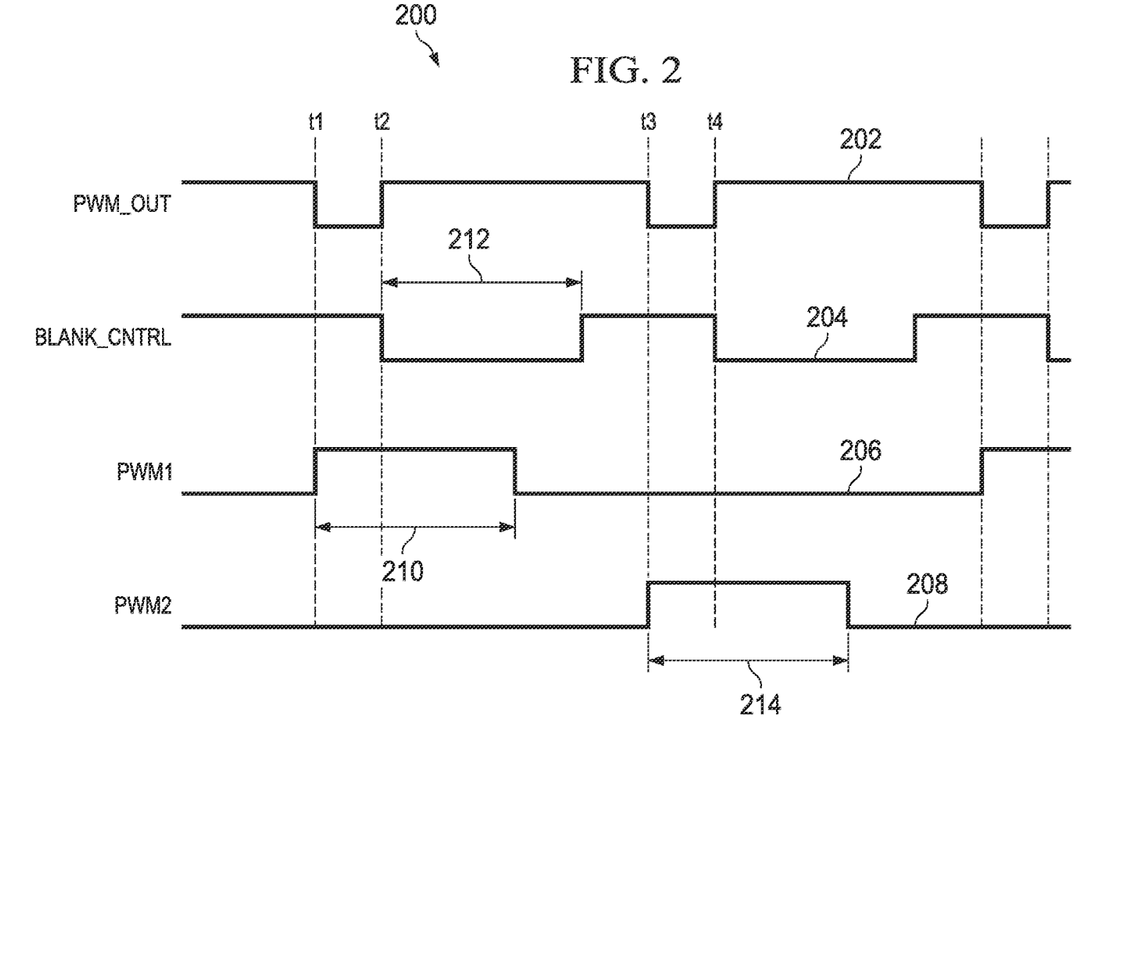
FIG. 2 is a signal diagram showing example signals in the circuit of FIG. 1.

FIG. 2 is a signal diagram 200 showing signals 202, 204, 206 and 208 in the circuit of FIG. 1. Thus, the description of FIG. 2 also refers to FIG. 1. For example, signal 202 is the PWM_OUT signal at 152, and the signal 204 is the blanking control signal provided at 162. The signals 206 and 208 are examples of the drive signals provided at 130 and 132 to respective phases. For example, at time t1, the PWM_OUT signal 202 goes low and, in response, the phase management circuit 146 generates the PWM1 signal 206. The PWM1 signal 206 has an on-time, shown at 210, which can be set by the phase management circuit 146. At time t2, the PWM_OUT signal 202 goes high, responsive to which the phase management circuit 146 pulls the blanking control signal 204 low. The duration between falling and rising edges of the blanking control signal 204 defines the blanking time 212. As described herein, the blanking time 212 can vary responsive to the transient event signal so that the number of pulses of the PWM_OUT signal can be controlled to either increase or reduce the phase current accordingly. From time t3 to t4, another pulse of the PWM_OUT signal 202 occurs. Responsive to the PWM_OUT signal 202 going low at t3, the phase management circuit 146 is configured to provide the PWM2 signal 208 to a next phase of the output stage 104. As shown the PWM signal 208 can have a fixed duration (e.g., a constant on-time), shown at 214, which can be larger than the pulse of the PWM_OUT signal 202. At time t4, responsive to PWM_OUT signal 202 going high, the phase management circuit 146 pulls the blanking control signal 204 low for the blanking time, which can vary responsive to the transient event signal.

Figure 3:
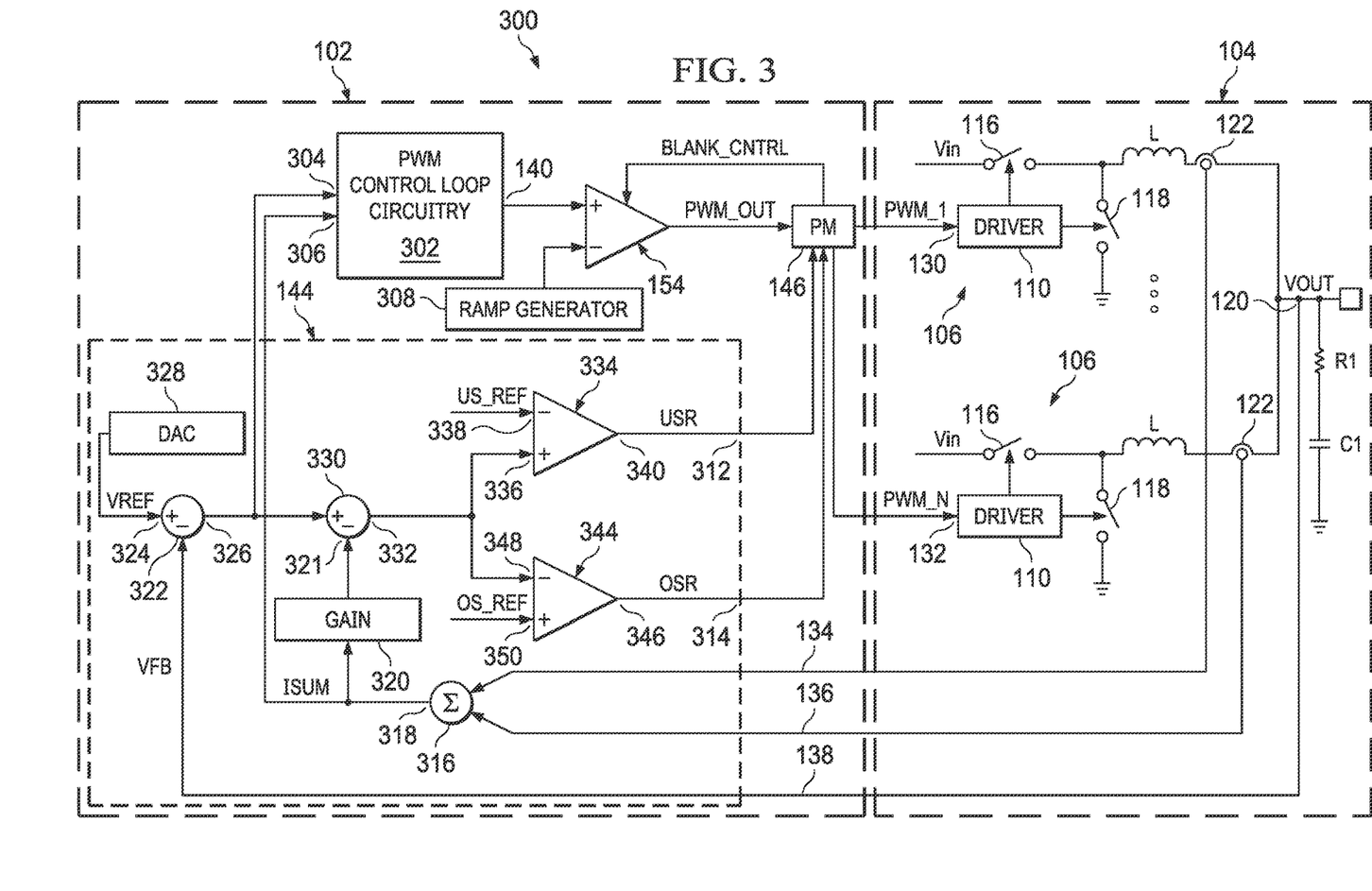
FIG. 3 illustrates another example of a multi-phase power regulator circuit.

FIG. 3 illustrates another example of a multi-phase power regulator circuit 300. The circuit 300 can be used to implement the circuit 100 of FIG. 1. Accordingly, the description of FIG. 3 also refers to FIG. 1. For example, the circuit 300 includes a control circuit 102 and a multi-phase power stage circuit 104. As described above, the multi-phase power stage circuit 104 includes phase driver circuits 106, each including a driver 110, switches 116 and 118 and inductor L. A current sensor 122 is also configured to provide a measure of phase current for the respective phase. Each phase driver circuit 106 is also configured to receive a respective PWM signal, shown as PWM_1 and PWM_N for controlling current that is supplied to the output terminal 120.

In the example of FIG. 3, the loop controller 133 includes PWM control loop circuitry 302 and the transient detector 144. The PWM loop control circuitry 302 has a voltage input 304 and a current sense input 306. For example, the PWM control loop circuitry 302 includes an arrangement of control circuitry (e.g., PI, PID or other control circuitry) configured to generate a loop control signal at output 140 to specify a current command for regulating the output voltage VOUT responsive to the respective signals at 304 and 306. A comparator has a non-inverting input coupled to the output 140 and an inverting input coupled to an output of a ramp generator 308. The ramp generator is configured to provide a ramp signal, which the comparator 154 is configured to compare with the loop control signal at 140 to provide the PWM_OUT signal.

The transient detector 144 has feedback input 138 and current sense inputs 134 and 136. The feedback input 138 is coupled to the output terminal 120 and is configured to receive a feedback signal VFB representative of the output voltage VOUT. The current sense inputs 134 and 136 are coupled to respective outputs of current sensors 122, and are thus configured to receive a measure of current for a respective phase. The transient detector 144 is configured to provide one or more transient event signals at transient event outputs 312 and 314 responsive to respective signals at the current phase inputs 134 and 136 and the feedback input 138.

In the example of FIG. 3, the transient detector 144 includes a combiner 316 having the current phase inputs 134 and 136 and an aggregate current output 138. The combiner 316 is configured to aggregate (e.g., add) the measured phase currents and provide a combined measure of current being supplied to the load by the multiphase output stage 104, shown as ISUM, at the aggregate current output 318. For example, ISUM provides a measure of load variation. A gain circuit 320 has an input coupled to the aggregate current output 318. Thus, the gain circuit 320 and input 306 are configured to receive the combined measure of current ISUM. The gain circuit 320 is configured to multiply the combined measure of current ISUM with a gain value, such as a value representative of a DC load line impedance to provide an output signal at an output 321 representative of a voltage response to changing current (e.g., described by ISUM*LL). The gain value can be set to a value provided by a manufacturer of the control circuit 102 or determined based on system requirements.

The transient detector 144 also includes a first difference circuit 322 having the feedback voltage input 138, a reference voltage input 324 and a first difference output 326. A digital-to-analog converter (DAC) 328 is configured to provide a reference voltage VREF to the input 324 representative of a regulated DC voltage value to be provided at the output terminal 120. The difference circuit 322 is configured to provide an error signal at the output 326 representative of a difference between the feedback voltage at 138 and VREF. The input 304 is coupled to the output 326 and thus also receives the error signal. A second difference circuit 330 has a first input coupled to the output 326 and a second input coupled to the output 321. The difference circuit 330 is configured to determine a difference between the error signal at 326 and the voltage response (e.g., ISUM*LL). The difference circuit 330 thus is configured to provide a signal at an output 332 representative of a measure of the transient condition at the output terminal 120, such as due to a load insertion or removal event.

A comparator 334 has a comparator output 340 and first and second comparator inputs 336 and 338. The comparator output 340 is coupled to transient event output 312. The first comparator input 336 (a non-inverting input) is coupled to the output 332, and the second input 338 (an inverting input) is coupled to an undershoot reference voltage US_REF. For example, the undershoot reference voltage US_REF can be provided by a DAC or other voltage source, such as a configurable voltage to set a threshold for detecting a voltage undershoot condition. The comparator 334 is configured to provide an undershoot reduction (USR) signal at the output 340 based on a comparison of the signal at 332 (e.g., a measure of the transient condition) and the undershoot reference voltage US_REF. The USR signal thus has a value (e.g., a command) to specify whether to implement undershoot reduction.

Another comparator 344 has a comparator output 346 and first and second comparator inputs 348 and 350. The comparator output 346 is coupled to transient event output 314. The first comparator input 348 (an inverting input) is coupled to the output 332, and the second input 350 (a non-inverting input) is coupled to an overshoot reference voltage OS_REF. For example, the overshoot reference voltage OS_REF can be provided by a DAC or other DC voltage source. The overshoot reference voltage OS_REF can be configurable, such as responsive to a configurable value to set a threshold for detecting a voltage overshoot condition. The comparator 344 is configured to provide an overshoot reduction (OSR) signal at the output 346 based on a comparison of the signal at 332 (e.g., a measure of the transient condition) and the overshoot reference voltage OS_REF. The OSR signal thus has a value (e.g., a command) to specify whether to implement overshoot reduction. In some examples, the USR and OSR signals are also provided to the PWM control loop circuitry 302, in which the PWM control loop circuitry uses the signals as part of the proportional and current mode control being implemented.

As described herein, the phase management circuit 146 is configured to provide drive signals at the phase outputs 130 and 132 responsive to the PWM_OUT signal and the transient event signals at 312 and 314. For example, the phase management circuit 146 is configured to control the number of phases being used (e.g., added or removed) responsive to the transient event signals at 312 and 314, such as described herein. Also, the phase management circuit 146 is configured to provide the blanking control signal BLANK_CTRL to the PWM comparator 154 (and to PWM logic if implemented in the PWM circuit) to set the blanking time between PWM pulses responsive to the transient event signals at 312 and 314.

Figure 4:
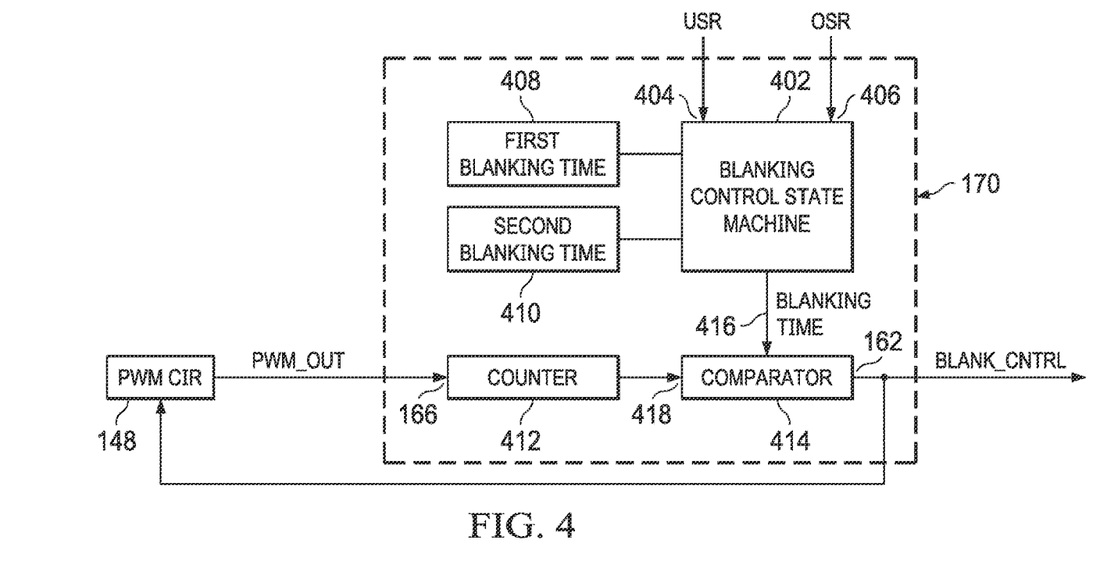
FIG. 4 illustrates an example blanking control circuit that can be implemented in the circuits of FIGS. 1 and 3.

FIG. 4 illustrates an example blanking control circuit 170 that can be implemented in the circuits of FIGS. 1 and 3 to provide a variable blanking time. Thus, the description of FIG. 4 also refers to FIGS. 1 and 3. In the example of FIG. 4, the blanking control circuit 144 includes a blanking control state machine 402 having inputs 404 and 406 coupled to respective outputs 312 and 314 of the transient detector circuit 144. The blanking control state machine 402 is configured to determine an operating state of the regulator circuit 100 responsive to the USR and OSR signals at inputs 404 and 406. For example, the operating state is a normal state or a transient state. The transient state further can include an undershoot state and an overshoot state. The blanking control state machine 402 is configured to set a blanking time for the PWM circuit 148 depending on the operating state. The blanking time can have a fixed value for each operating state, or the blanking time can be variable for one or more states, such as by setting the blanking time responsive to the USR and OSR signals.

In the example of FIG. 4, the blanking control circuit 170 includes registers 408 and 410. For example, the register 408 is configured to store a first blanking time value that is used for setting the blanking time during normal and overshoot states. The register 410 is configured to store a second blanking time value that is used for setting the blanking time during an undershoot state. The blanking time value for the undershoot state is less than the blanking time used in either the normal or undershoot states. The example of FIG. 4 includes two registers to store values to set respective blanking times. In other examples, a different number than two blanking times can be used and an appropriate number of registers or other mechanisms can be used to set the blanking times. The blanking control state machine 402 is configured to select a value for the blanking time from one of the registers 408 or 410 depending on the state determined from the USR and OSR signals and provide the selected blanking time value at a comparator input 416.

The blanking control circuit 170 also includes a counter 412 and comparator 414. The counter has the input 166, and thus is configured to receive the PWM_OUT signal. For example, the counter 412 is configured to reset and count from a starting value responsive to the PWM_OUT signal (e.g., at each rising edge for an active low PWM signal). The comparator 414 has input 416 coupled to the output of the blanking state machine 402 and another input 418 coupled to an output of the counter 412. For example, the comparator input 416 is configured to receive a blanking time count value representative of the selected blanking time. The comparator 414 is configured to provide the BLANK_CTRL signal responsive to comparing the count value of the counter 412 with the blanking time count value. For example, the comparator 414 is configured to provide the BLANK_CTRL signal with a first state (e.g., low) responsive to the PWM_OUT signal going high and remains in the first state for the blanking time. When the counter output equals the blanking time count value, which is representative of the blanking time interval, the comparator 414 is configured to change the BLANK_CTRL signal to a second state (e.g., high). The BLANK_CTRL signal will remain in the second state until after the next pulse of the PWM signal. As described herein, the BLANK_CTRL signal is provided to the PWM circuit 148 to control the blanking time between pulses.

Figure 5:
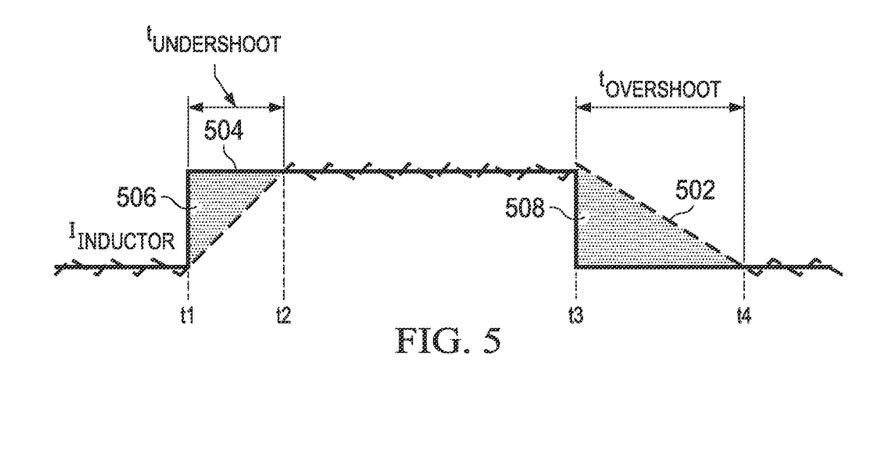
FIG. 5 is a diagram showing an example of undershoot and overshoot transient events for current signals in a multi-phase power regulator.

FIG. 5 is a signal diagram 500 showing an example of inductor current 502 and load current 504 for undershoot and overshoot transient events 506 and 508, respectively. An onset of a load occurs at time t1, which causes the the load current 504 to exhibit a rapid step up while the inductor current 502 increases over time up to time t2. The time during which the inductor current 502 increases (between t1 and t2) is a slew time representative of voltage undershoot 506. Conversely, at time t3, a load release occurs, in which the load current 504 steps down and whereas the inductor current 502 slews downwardly until time t4. The time during which the inductor current 502 decreases (between t3 and t4) is a slew time representative of voltage overshoot 508. The circuits and systems described herein are configured to adjust the inductor current so the voltage undershoot and overshoot are reduced.

Figure 6:
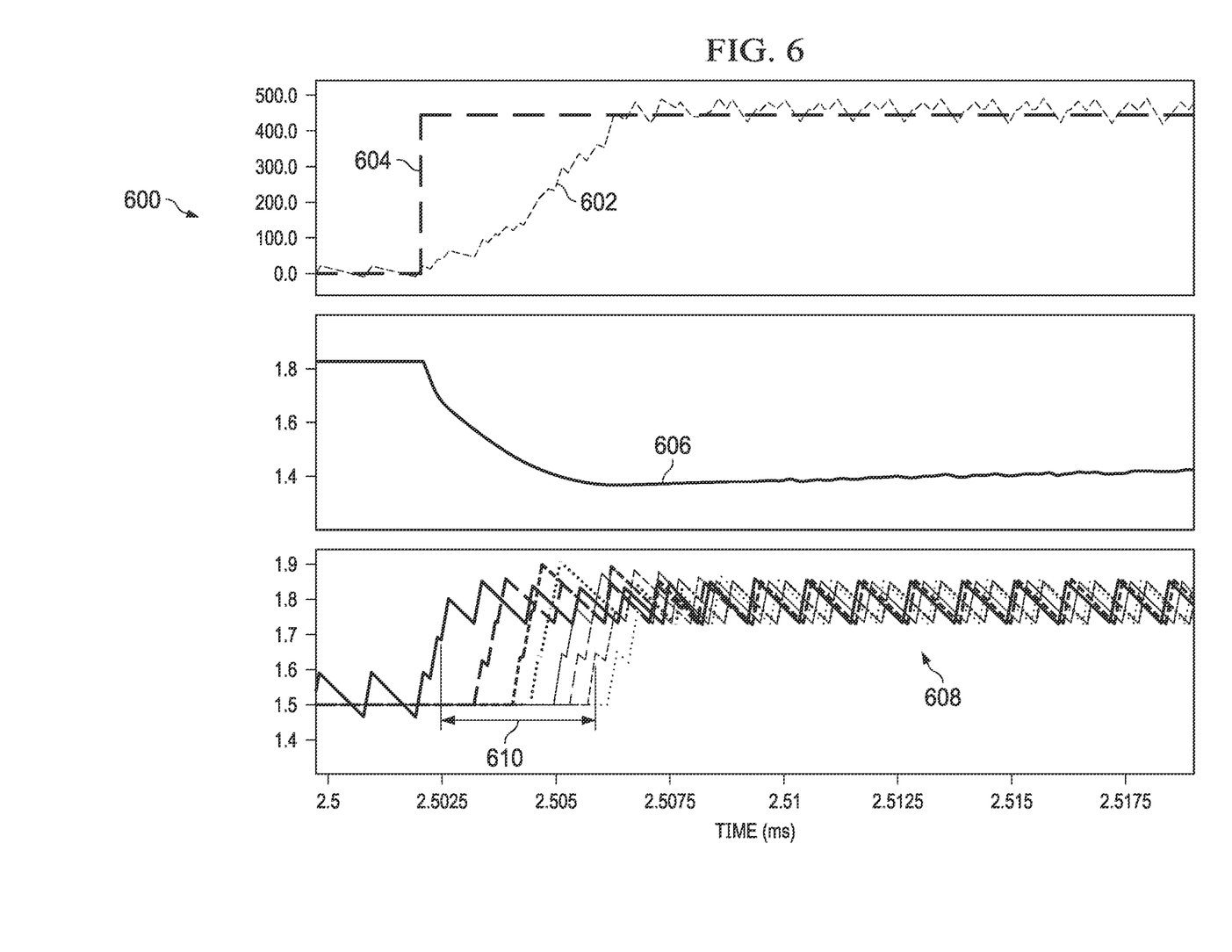
FIG. 6 is a signal diagram showing example signals of a multi-phase power regulator circuit in the absence of implementing controls to reduce undershoot.

FIG. 6 is a signal diagram 600 showing examples of signals of a multi-phase power regulator circuit 100 in the absence of implementing controls to reduce undershoot. The signal diagram 600 shows inductor current 602 as well as load current 604 and the output voltage 606 (e.g., VOUT at the output terminal 120). The load current 604 exhibits a step increase responsive to a load insertion event, and the inductor current increases gradually. The diagram 600 also shows phase-wise inductor currents overlayed at 608, which are added to the interleave over time (e.g., one phase at a time over about 4 microseconds) responsive to the load. In the example of FIG. 6, there is a delay in adding all respective phases, shown at 610.

Figure 7:
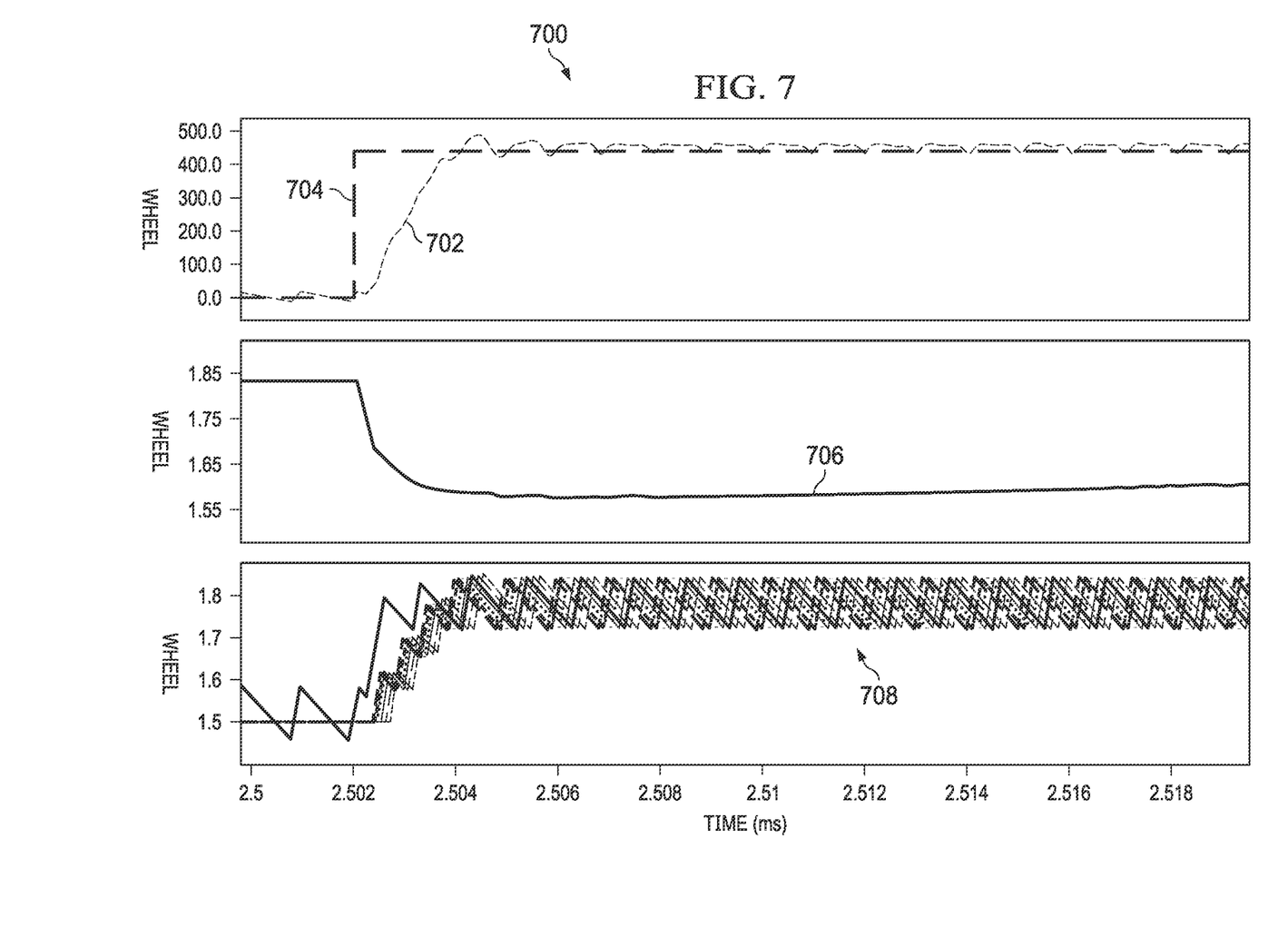
FIG. 7 is a signal diagram showing example signals of a multi-phase power regulator circuit configured to implement controls to reduce undershoot by adding phases.

FIG. 7 is a signal diagram 700 showing examples of signals of a multi-phase power regulator circuit configured to implement controls to reduce undershoot, as described herein. The signal diagram 700 shows inductor current 702 as well as load current 704 and the output voltage 706 (e.g., VOUT at the output terminal 120). The diagram 700 also shows phase-wise inductor currents overlayed at 708. In contrast to the example of FIG. 6, in which phases are added to the interleave sequentially over time, all the phases are added into the interleave at the same time (e.g., in about 460 nanoseconds from the transient event) to provide the inductor currents shown at 708. As a result, the minimum output voltage 706 is about 1.58 V and compared to the minimum output voltage of about 1.37 V for FIG. 6.

Figure 8:
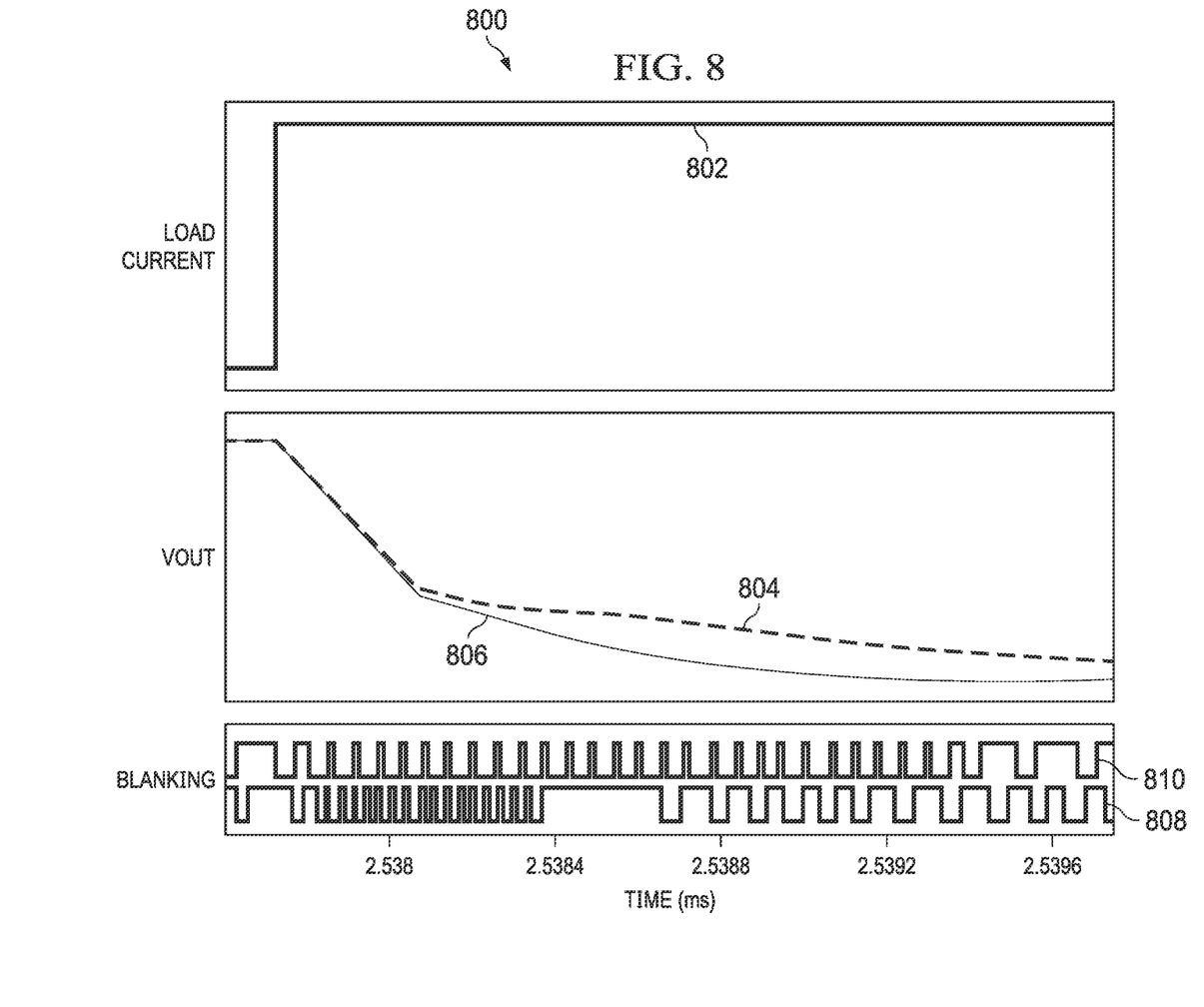
FIG. 8 is a signal diagram showing example signals of a multi-phase power regulator circuit with and without implementing dynamic blanking controls.

FIG. 8 is a signal diagram 800 showing signals of a multi-phase power regulator circuit with and without implementing dynamic blanking controls for a load insertion event. The diagram shows the load current 802, which is substantially the same irrespective of whether dynamic blanking controls are implemented. The diagram 800 also shows the output voltage at 804 with dynamic blanking controls and at 806 without dynamic blanking controls. The diagram also shows PWM_OUT signals 808 with dynamic blanking controls and at 810 in the absence of implementing blanking controls. For example, the PWM signals 808 have a 25 nanosecond blanking time compared to PWM signals 810, which have a 50 nanosecond blanking time. Thus, because a lower blanking time is used during the undershoot transient event, the regulator circuit (e.g., circuit 100) can provide a faster output voltage response, shown at 804, compared to the voltage response at 806.

Figure 9:
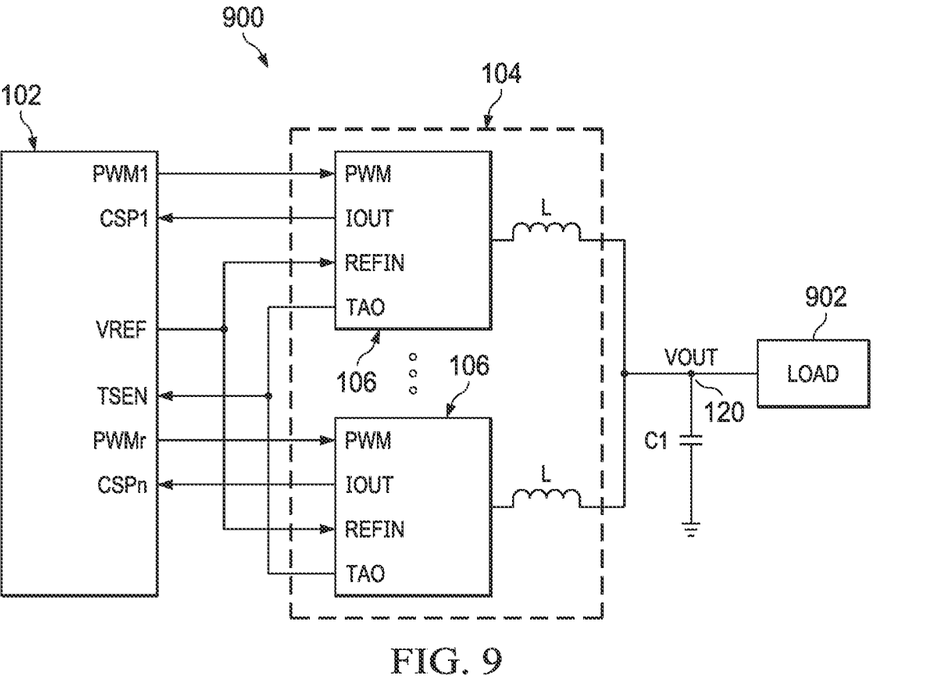
FIG. 9 illustrates an example system implementing a multi-phase power regulator circuit.

FIG. 9 illustrates an example of system 900 implementing a multi-phase power regulator circuit, such as a buck regulator as described herein. Accordingly, the description of FIG. 9 also refers to FIGS. 1 and 3. The system 900 includes a control circuit 102 configured to control phases 106, which form a multi-phase power stage circuit 104, such as described herein. The system 900 can include any number of two or more phases 106. In an example, each of the control circuit 102 and the power stages 106 are implemented as respective ICs, which can be mounted on a printed circuit board. In another example, the control circuit and power stages could be implemented on a common substrate, such as in an SoC. Also, the inductor for each phase 106 can be external, as shown, or the inductors can be internal to the IC implementing the respective phase 106. An output capacitor C1 and a load are coupled to the output terminal 120. For example, the load 902 can be an application specific integrated circuit (ASIC), a data center, server, hardware accelerator, network interface card to name a few. Because the control circuit 102 is configured to reduce transients (e.g., undershoot and overshoot), the system 900 can use a smaller capacitor compared to similar power systems.

Figure 10:
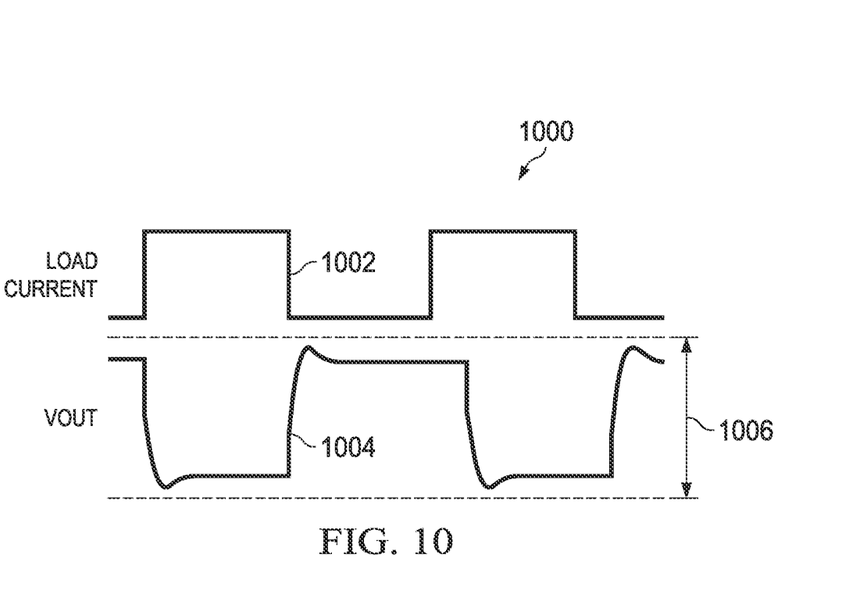
FIG. 10 is a signal diagram showing example load current and output voltage signals.

FIG. 10 is a signal diagram 1000 showing load current and output voltage signals 1002 and 1004 along with a tolerance band 1006 for a load (e.g., load 902). The tolerance band 1006 shows a voltage above which there is risk of damage to the load device and a lower voltage at which the load device can shut down and/or adversely affect operation. Implementing the regulator described herein provides increased margin with respect to the tolerance band. As a result, the size of the output capacitor C1 can be reduced. Other improvement performances (e.g., faster voltage response) also can be realized with respect to existing regulator circuits.

In this description, the term "couple" or "couples" means either an indirect or direct connection. Thus, if a first device couples to a second device, that connection may be through a direct connection or through an indirect connection via other devices and connections. For example, if device A generates a signal to control device B to perform an action, then: (a) in a first example, device A is coupled to device B; or (b) in a second example, device A is coupled to device B through intervening component C if intervening component C does not substantially alter the functional relationship between device A and device B, so device B is controlled by device A via the control signal generated by device A.

The recitation "responsive to" means "responsive at least in part to." Therefore, if X is responsive to Y, X may be a function of Y only or a function of Y and any number of other factors.

A device or component that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

Modifications are possible in the described embodiments, and other embodiments are possible, within the scope of the claims.

What is claimed is:

1. A circuit comprising:
   a loop controller having current phase inputs, a feedback input, a control loop output and a transient event output, the feedback input adapted to be coupled to an output terminal of a multi-phase power stage;
   a pulse width modulation (PWM) circuit having a blanking input, a control input and a PWM output, the control input coupled to the control loop output; and
   a phase management circuit having a transient detect input, a PWM input, a blanking output and phase outputs, the transient detect input coupled to the transient event output, the PWM input coupled to the PWM output, the blanking output coupled to the blanking input, and each of the phase outputs adapted to be coupled to a respective phase of the multi-phase power stage, the phase management circuit configured to provide a blanking control signal at the blanking output representative of a variable blanking time.

2. The circuit of claim 1, wherein the loop controller includes a transient detector comprising:
a combiner having the current phase inputs and an aggregate current output, each of current phase inputs configured to receive a measure of current for a respective phase;
a gain circuit having a gain input and a gain output, the gain input coupled to the aggregate current output;
a first difference circuit having the feedback input, a reference voltage input and a first difference output; and
a second difference circuit having a first input and a second input, the first input coupled to the first difference output, and the second input coupled to the gain output.

3. The circuit of claim 2, wherein the transient detector comprises:
a comparator having a comparator output and first and second comparator inputs, the first comparator input coupled to an output of the second difference circuit, the second comparator input configured to receive a transient reference voltage, the comparator output coupled to the transient detect input.

4. The circuit of claim 3, wherein:
the phase management circuit comprises a blanking control circuit configured to provide the blanking control signal at the blanking output,
the PWM circuit is configured to provide a PWM signal at the PWM output responsive to the blanking control signal and respective signals at the control input, and
the phase management circuit is configured to provide drive signals at the phase outputs responsive to the PWM signal and a transient event signal provided by the comparator at the comparator output.

5. The circuit of claim 3, wherein the transient detect input is a first transient detect input, the comparator is a first comparator having a first comparator output coupled to the first transient detect input, and the transient reference voltage is an undershoot reference voltage, the transient detector comprising a second comparator having a second comparator output, a third comparator input and a fourth comparator input, the third comparator input coupled to the output of the second difference circuit, the second comparator input configured to receive an overshoot reference voltage, and the second comparator output coupled to a second transient detect input.

6. The circuit of claim 5, wherein:
the phase management circuit comprises a blanking control circuit configured to provide a blanking control signal at the blanking output to decrease a blanking time for respective phase signals provided at the phase outputs responsive to a signal at the first comparator output being representative of an undershoot at the output of the multi-phase power stage, and
the blanking control circuit is configured to provide the blanking control signal to increase the blanking time for drive signals provided at the phase outputs responsive to a signal at the second comparator output being representative of an overshoot at the output of the multi-phase power stage.

7. The circuit of claim 6, wherein:
the phase management circuit is configured to increase a number of phases driven by the respective drive signals to reduce the undershoot at the output of the multi-phase power stage responsive to the signal at the first comparator output being representative of an undershoot transient event at the output of the multi-phase power stage,
the PWM circuit is configured to provide a PWM signal at the PWM output responsive to the blanking control signal and respective signals at the control input, and
the phase management circuit is configured to provide the drive signals at the phase outputs responsive to the PWM signal and respective signals at the first and second comparator outputs.

8. The circuit of claim 1, wherein the phase management circuit comprises a blanking control circuit configured to provide a blanking control signal at the blanking output responsive to a transient event signal at the transient detect input.

9. The circuit of claim 8, wherein the blanking control circuit comprises:
a state machine configured to determine a phase management state responsive to the signal at the transient detect input; and
a timer circuit configured to provide the blanking control signal responsive to a PWM signal at the PWM output so the blanking control signal has a blanking time interval responsive to the phase management state.

10. The circuit of claim 9, wherein the multi-phase power stage includes a respective driver circuit for each phase of the multi-phase power stage, each of the driver circuits having a respective drive input coupled to a respective one of the phase outputs of the phase management circuit.

11. A circuit comprising:
a loop controller configured to provide a loop control signal responsive to a feedback voltage representative of an output voltage of a multi-phase power stage and a combined measure of current provided to phases of the multi-phase power stage, the loop controller including a transient detector configured to provide a transient event signal responsive to detecting a transient event based on the output voltage and the combined measure of current;
a phase management circuit configured to provide a blanking control signal responsive to the transient event signal, the phase management circuit also configured to provide drive signals to respective phases of a power stage responsive to a pulse width modulation (PWM) output signal; and
a PWM circuit configured to provide the PWM output signal responsive to the loop control signal and the blanking control signal, in which the PWM output signal has a variable blanking time responsive to the blanking control signal.

12. The circuit of claim 11, wherein the transient detector is configured to provide the transient event signal responsive to a difference between a first signal representative of voltage droop and a second signal representative of a combined changing phase current.

13. The circuit of claim 12, wherein the transient detector comprises:
a combiner configured to provide the combined measure of current responsive to measures of current for the phases of the multi-phase power stage;
a gain circuit configured to multiply the combined measure of current by a gain value to provide a respective voltage;
a difference circuit configured to provide a signal representative of the difference between the first and second signals responsive to a comparison of the respective voltage and an error signal, the error signal being representative of a difference between the feedback voltage and a voltage reference.

14. The circuit of claim 13, wherein the transient detector comprises:
a first comparator configured to compare the signal representative of the difference between the first and second signals with respect to an undershoot reference to provide an undershoot event signal; and
a second comparator configured to compare the signal representative of the difference between the first and second signals with respect to an overshoot reference to provide an overshoot event signal.

15. The circuit of claim 14, wherein the phase management circuit includes a blanking control circuit configured to provide the blanking control signal responsive to the undershoot event signal and the overshoot event signal.

16. The circuit of claim 14, wherein:
the phase management circuit comprises a blanking control circuit configured to provide the blanking control signal to decrease a blanking time for the PWM output signal responsive to the undershoot event signal, and
the blanking control circuit is configured to provide the blanking control signal to increase the blanking time for the PWM output signal responsive to the overshoot event signal.

17. The circuit of claim 16, wherein the phase management circuit is configured to increase a number of phases driven by the respective drive signals to reduce undershoot of the output voltage of the multi-phase power stage responsive to the undershoot event signal.

18. The circuit of claim 11, wherein the phase management circuit includes a blanking control circuit configured to provide the blanking control signal, the blanking control circuit comprising:
a state machine configured to determine a phase management state responsive to the transient event signal; and
a timer circuit configured to provide the blanking control signal responsive to the PWM output signal so the blanking control signal has a blanking time interval responsive to the phase management state.

19. A system comprising:
a multi-phase power stage circuit comprising:
a first phase drive circuit having a first drive input and a first drive output, the first drive output coupled to an output terminal; and
a second drive circuit having a second drive input and a second drive output, the second drive output coupled to the output terminal;
first and second current sensors having first and second current sense outputs, each of the first and second current sensors configured to provide a measure of current at the respective first and second current sense outputs representative of current for the respective first and second drive circuits; and
a control circuit comprising:
a loop controller having first and second current phase inputs, a feedback input, a control loop output and a transient output, the first and second current phase inputs coupled to the respective first and second current sense outputs, the feedback input coupled to the output terminal, the loop controller configured to provide a transient event signal at the transient output responsive to detecting a transient event based on respective signals at the current phase inputs and the feedback input;
a pulse width modulation (PWM) circuit having a blanking input, a control input and a PWM output, the control input coupled to the control loop output; and
a phase management circuit having a transient detect input, a PWM input, a blanking output and phase outputs, the transient detect input coupled to the transient output, the PWM input coupled to the PWM output, the blanking output coupled to the blanking input, and each of the phase outputs coupled to a respective drive input of the multi-phase power stage circuit, the phase management circuit configured to control a blanking time of a blanking control signal provided at the blanking output responsive to the transient event signal.

20. The system of claim 19, wherein:
the loop controller includes a transient detector configured to provide the transient event signal responsive to detecting the transient event based on respective signals at the current phase inputs and the feedback input, the loop controller also configured to provide a loop control signal,
the phase management circuit includes a blanking control circuit configured to provide the blanking control signal responsive to the transient event signal, the phase management circuit also configured to provide drive signals to respective first and second phase inputs responsive to a PWM output signal, and
the PWM circuit is configured to provide the PWM output signal responsive to the loop control signal and the blanking control signal, in which the PWM output signal has a variable blanking time between PWM pulses responsive to the blanking control signal.

21. The system of claim 20, wherein the transient detector is configured to determine a difference between a first signal representative of a voltage droop and a second signal representative of a combined changing phase current, the transient detector configured to provide an undershoot event signal responsive to a comparison between the difference and an undershoot reference and to provide an overshoot event signal responsive to a comparison between the difference and an overshoot reference.

22. The system of claim 21, wherein:
the blanking control circuit is configured to provide the blanking control signal at the blanking output to decrease the blanking time responsive to the undershoot event signal, and
the blanking control circuit is configured to provide the blanking control signal to increase the blanking time responsive to the overshoot event signal.

23. The system of claim 21, wherein the phase management circuit is configured to increase a number of phases driven by the respective drive signals to reduce undershoot of the output terminal of the multi-phase power stage circuit responsive to the undershoot event signal.

* * * * *